Jan. 24, 1967  J. G. BOOIJ  3,300,027
INSTALLATION FOR UNLOADING A NUMBER OF HOLDERS
Filed April 2, 1965  2 Sheets-Sheet 2

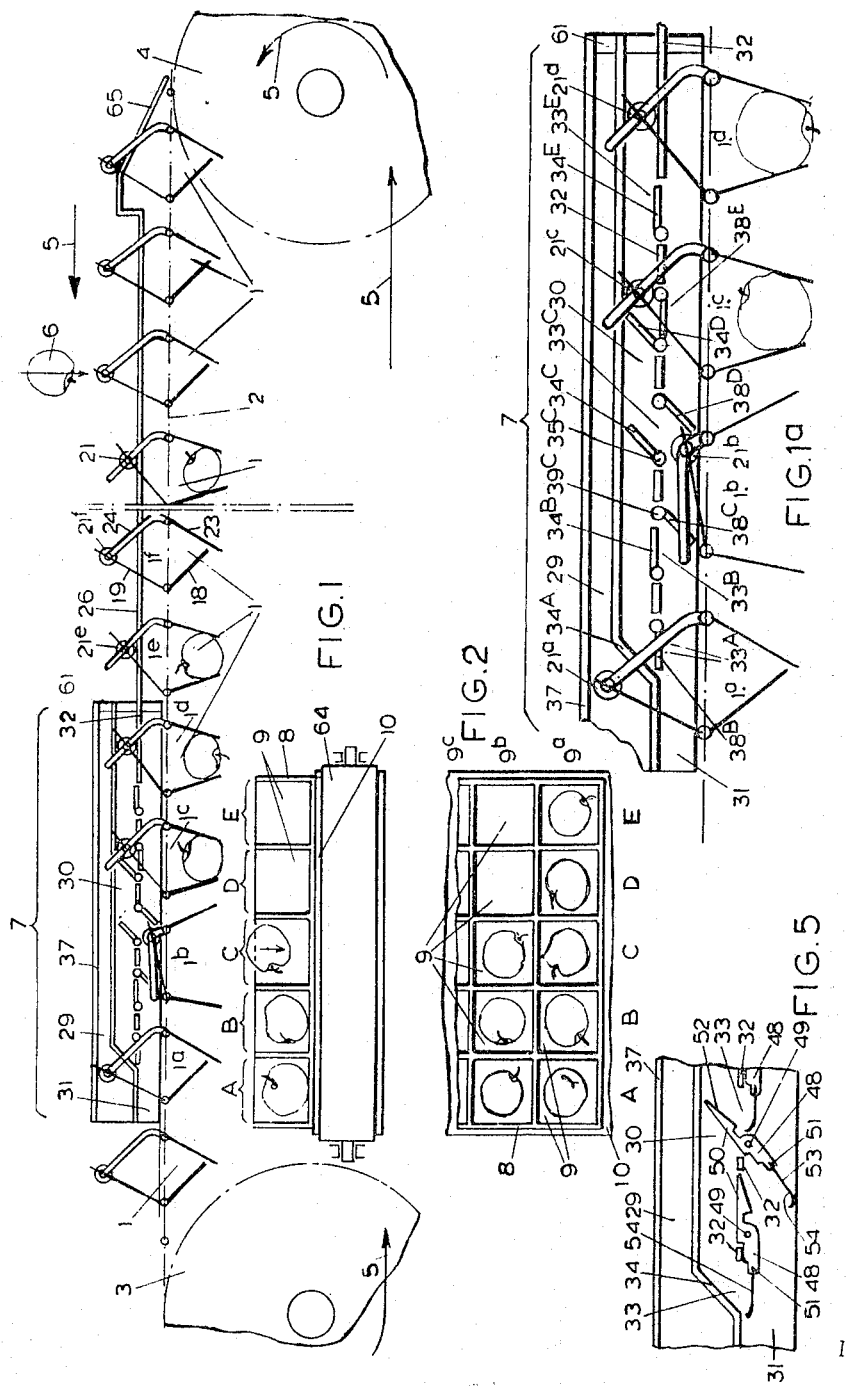

INVENTOR
JAN GEERT BOOIJ
BY *Mirie and Smiley*
ATTORNEY

3,300,027
INSTALLATION FOR UNLOADING A NUMBER OF HOLDERS

Jan Geert Booij, Dordrecht, Netherlands, assignor to Aviolanda Maatschappij voor Vliegtuigbouw N.V., Papendrecht, Netherlands, a Dutch manufacturing company
Filed Apr. 2, 1965, Ser. No. 444,969
Claims priority, application Netherlands, Apr. 3, 1964, 6403551
10 Claims. (Cl. 198—143)

This invention relates to an installation for unloading a number of bottom-unloading holders not all of which are necessarily filled, and which are conveyed from a loading station over a specific path along an unloading station comprising a number of successive unloading points, one of the holders being unloaded successively at each of the unloading points, each of the holders comprising at least two relatively movable parts which in order to form a bottom-closed or bottom-open holder respectively assume a closed and an open relative position in dependence on a respective closing and unloading position of actuating means borne by the holder and couples to at least one of the said movable parts, the holder actuating means being displaced at least perpendicularly with respect to the path of movement during the change of the relative position of the movable parts, and each of the unloading points which the filled holders are required to pass without being unloaded is provided with a regulator element which is controlled by a control element and which can be brought into an operative position and an inoperative position in which it respectively does and does not engage in the paths of the actuating elements in the closing position and forces the actuating means passing into such track from the closing position to the unloading position.

An installation of this kind is known for successively filling a box with fruit, the pieces of fruit each being conveyed separately in a holder from a sorting machine to the unloading station, where they are successively deposited at their intended positions in the box. In this case the regulator elements are adjusted by a photoelectric cell, which detects the dropping of the fruit from the holders and transmits signals to an electrical or electronic installation in order to control the regulating elements. These expensive steps are particularly necessary in those cases where it is not certain whether the holders are or are not filled.

The regulator element of an unloading point cannot be brought into the path of the actuating means until the dropping of the piece of fruit has been detected at the preceding unloading point. Consequently the maximum number of unloadable holders per unit of time is relatively small.

The installation according to the invention is much simpler, hence cheaper and its capacity is not limited by constant dropping and switching times, and according to the invention this effect is achieved in that in addition to the closed and open positions, the movable parts of the holder can occupy a third relative position in which the holder is open at the top but closed at the bottom so that the actuating means are then in a third position which corresponds to the said third relative position and which differs from the closing and unloading position, the third relative position is maintained if the holder is empty and no other relative position is imposed from outside, the movable parts are driven from the third position to the closed relative position by the weight of the holder load, and that the actuating means at the unloading station meet a regulator and/or a control element only if they are in the closing position on arrival.

Since the empty and full holders arriving at the unloading point can now be distinguished by the position of the actuating element, the unloading station can be so arranged that only the filled holders take part in the unloading process and each of these filled holders results in an effective movement.

These and other features of the invention will be explained hereinafter with reference to the drawings, wherein:

FIG. 1 is a diagrammatic side elevation of the path over which a number of holders is conveyed;

FIG. 1a is an enlarged side elevation of the portion of the conveyor and unloading apparatus situated above the unloading station;

FIG. 2 is a top plan view of part of the box to receive the released articles;

FIG. 5 is a side elevation of part of the installation at the unloading station with regulator and control elements of a different construction.

Figure 3:
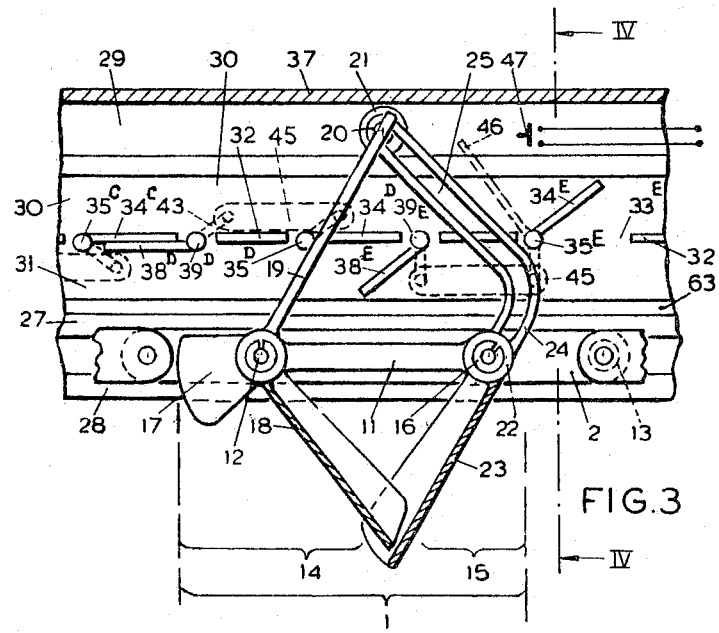
FIG. 3 is a partial cross-section of the installation on the line III—III in FIG. 4, one of the holders being shown in the third position.

In the drawings, reference 1 denotes holders which are interconnected by links 2 to form an endless connected chain which is taken around two driven sprocket wheels 3 and 4 at the reversal stations and which is driven by said sprocket wheels in the direction of the arrows 5 (see FIG. 1).

Figure 4:
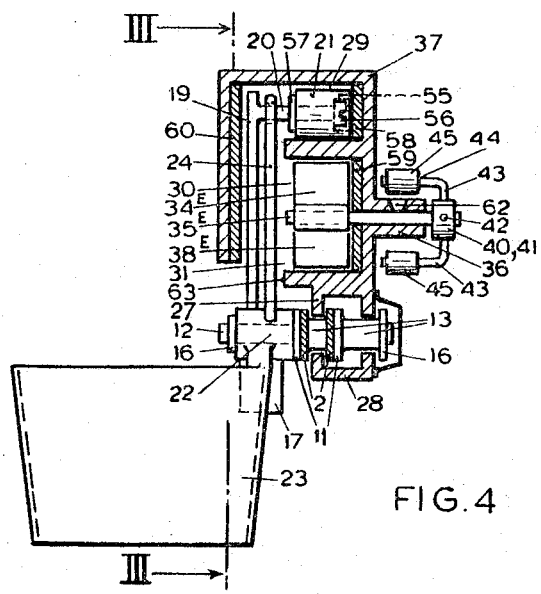
FIG. 4 is a cross-section of the installation at the unloading station as illustrated by section line IV—IV in FIG. 3.

At 6, the empty holders 1 pass a loading station which has not been shown in detail. At this loading station the holders 1 may be loaded either manually or in some other way with a fruit—for example an apple or pear—or an egg, tomato or similar article. These articles, which may for example be delivered nonuniformly by a sorting machine, each enter one of the holders 1. Since the holders 1 move at a specific speed while the articles are delivered indefinitely, not all the holders 1 will be filled. The holders 1 are conveyed on to the unloading station 7 and as they pass one of the unloading stations A, B, C, D or E at this unloading station each full holder is unloaded and each of the released articles is received in a box 8 containing compartments 9. These compartments 9 adapted to receive the articles are situated in rows 9a, 9b, 9c, etc., each row containing compartments 9A to 9E, the pitch or distance between which coincides with the pitch of the unloading stations A to E inclusive. The installation is so designed that the boxes 8 are completely filled in succession. To this end, the conveyor belt 10 which brings up empty boxes 8 and carries off full boxes, is periodically advanced by the row spacing by the end rollers 64 being driven, so that each row is for some time exactly beneath the path of the holders 1 until the last compartment 9e of the row has been filled. Each holder 1 comprises two support plates 11 which are in the form of chain links (see FIGS. 3 and 4). A pin 12 is fitted through each of the ends of said support plates 11 and bears two chain rollers 13, the end of two connecting links 2 and one of two relatively movable parts 14 and 15. The system on each pin is enclosed between circlips 16. The left-hand part 14 consists of a bush 17 pivotable about the pin 12, a downwardly extending carrier 18, an upwardly extending actuating rod 19, a cross-member 20 borne by the end of the rod 19, and a roller 21 rotatable about the free end of the cross-member 20. The right-hand part 15 comprises a bush 22, a carrier 23 extending down from said bush, and an upright connecting element 24 having a L-shaped slot 25, in which the cross-member 20 engages to couple the movement of part 14 to that of part 15. The carriers 18 and 23 are each shaped to correspond to the articles and are formed from a bent strip of thin sheet material welded to one of the bushes 17 and 22. Bush 17 is constructed as a counterweight which compels the parts 14 and 15 of holder 1 to assume the third relative position shown in FIG. 3. In these conditions the roller 21 is in the third position, i.e., the highest possible position. The empty holders pass the loading station in this third relative position. If an article is deposited in the holder, the weight of the article presses on the carriers 18 and 23 so that the parts 14 and 15 turn about the pivots 12 in opposition to the counterweight into the closed relative position, in which the roller 21e rests on a rail 26 when the holder is in the closed position. (See holder 1e in FIG. 1.) Rail 26 prevents any further lowering of roller 21 to the unloading position (see 21b, FIG. 1a) which would result in the parts 14 and 15 prematurely assuming the open relative position with the load dropping from the bottom of the holder. The shape of the holder 1 may differ considerably from the example illustrated. The important point is that at least one of the movable parts of the holder is coupled to actuating means which like the roller 21 as a result of describing an arc after a change of the relative position of the adjustable parts, are displaced either vertically, or laterally, and at least perpendicularly with respect to the path of movement.

Two guide strips 27 and 28 guide the rollers 13 both on the outgoing and return path of the holders 1 between the reversal stations 3 and 4. At the unloading station 7, the installations is provide with three tracks 29, 30, 31 for guiding the rollers 21 of the holders 1, such tracks extending in parallel relationship to the guide strips 27 and 28 in a housing 37. The rollers 21 of the empty holders 1 pass the unloading station in the top track 29 (see roller 21a of holder 1a, FIG. 1a). The rail 26 connects with the partition 32 between the tracks 30 and 31. At each unloading point, the partition is formed with an opening 33 such that the roller 21 can pass through the opening. A regulator element 34 in the form of a flap is provided at each opening 33. With the exception of the regulator element 34A which is situated at the departure side of the unloading station and which is preferably constructed as a fixed guide, the rectangular elements are all connected to pivots 35 which are rotatable in a single bearing 36 which extends over the entire length of the unloading station 7 in parallel relationship to the partition 32 behind the housing 37. A control element 38 is coupled to each pivotable regulator element 34 and is connected to a separate pivot 39 which is also rotatable in the bearing 36. The coupling between the elements is obtained by means of two hubs 40 and 41 which are respectively secured to the pivots 35 and 39 by means of setscrews 42 and which each bear a bent-over rod 43, the free round end 44 of which fits in a round hole in a block 45 (see FIGS. 3 and 4). The blocks 45 are alternately above and below the bearing 36 to prevent their obstructing one another's movements.

The pivotable regulator elements 34B, 34C, 34D and 34E of the respective unloading points B, C, D and E are coupled to the control elements 38B, 38C, 38D and 38E situated at the unloading points A, B, C and D respectively situated next to them on the departure side, while the two pivots of two coupled elements extend along those ends of the parts of the partition 32 which are adjacent the openings.

The movable elements 34 may occupy:

The operative position, as for example the regulator element 34C, in which case they enclose with the associated opening 33 of the partition 32 an acute angle which faces the arriving rollers 21 of the holders 1;

Or the inoperative position as for example regulator element 34E, in which case they close the associated opening 33.

As a result of the above-described coupling between the elements, the regulator element 34 (34C) assumes the operative position if the control element 38 (38C) is in the control position, while if the control element (38E) is in its inoperative position the regulator element (34E) coupled thereto automatically assumes the inoperative position. The control elements 38 are each situated in an opening 33 in the inoperative position, but they do not shut the opening to the roller 21. The latter can press the control element 38 away from the opening into the control position.

A magnet 46 is coupled to the pivot 35E and whenever the control element 38E assumes the inoperative position actuates an electrical contact 47 in an electric circuit for controlling the drive for the conveyor belt 10.

The operation of the installation will be described with reference to the position illustrated in FIGS. 1 and 2. The compartments of row 9a and the compartments 9A and 9B of row 9b are all filled, while an article has just dropped from holder 1b into compartment 9C of row 9b, because the regulator element 34C engaging in the track 30 pressed roller 21b of holder 1b down through opening 33C into track 31, so that the carriers 18 and 23 coupled to the roller 21b assumed the release position in consequence of the movable parts 14 and 15 of said holder being in the open relative position. On its path through the opening 33C, roller 21b encountered the control element 38D and pressed the same into the control position so that the regulator element 34D assumes the operative position. On further driving of the chain bearing the holders 1, roller 21b presses the control element 38C into the inoperative position, while the roller 21c of the still loaded holder 1c passes the opening 33D along the regulator element 34D and hence brings the control element 38E into the control position, and thus the regulator element 34E into the operative position. During the downward movement of roller 21c the movable parts 14 and 15 connected to said roller pass from the closed relative position to the open relative position and thus drop the article into the compartment 9D. Roller 21c encounters the control element 38D and thus brings the regulator element 34D into the inoperative position behind it. Finally, roller 21d of the loaded holder 1d which has also entered the track 30 is brought from the closed position to the release position by regulator element 34E and itself drives control element 38E into the inoperative position and hence regulator element 34E into the inoperative position. By bringing regulator element 34E into the inoperative position, the control element 38E brings the regulator element 34A into the operative position, because the roller 21 of the next full holder now encounters said regulator element 34A.

After compartment 9e has also been filled with an article, namely the article from holder 1d, the conveyor belt 10 moves over a distance such that the completely full row 9b is moved away from and row 9c is moved to a position beneath the path of movement of the holders 1. This advance movement is also rendered operative by roller 21d as it forces away the control element 38E coupled to the magnet 46. The advance of the box 8 takes place just as the next full holder 1 moves along the unloading station to unloading point A.

Since the rollers 21 (21a) of the empty holders 1 follow the separate track 29 they do not interfere with the actuation of the regulator and control element.

The coupled regulator and control elements may be made in one piece 48 as shown in FIG. 5, such element 48 being pivotable about a pivot 49 secured to the housing 37. The right-hand part 50 forms the regulator element and the left-hand part 51 the control element. The action is in principle the same as with the above-described construction. Roller 21 first runs on the regulator surface 52 and is thus forced into the unloading position and in track 31 runs against the control surface 53 to bring the regulator element 50 into the inoperative position. It is clear that the element 50 comes into the operative position as soon as a roller 21 meets the control surface 54 as it passes through an opening 3. To reduce wear and obtain smooth running of the holders 1, a number of additional steps are proposed: the roller 21 is preferably made from nylon and has a cavity 55 at its free end. This cavity receives the head of the bolt 56 which is screwed axially into the free end of the cross-member 20. The free end of the roller 21 is thus closed. The same is obtained at the other end by means of a circlip 57. Instead of a nylon roller 21, a steel roller may be used, the housing 37 being lined with nylon strips 58, 59 and 60 on the inside.

Strip 59 is disposed around the parts of the wall 32 so that the housing is also lined at the site of the openings 33. The entry to the tracks 29, 30 and 31 is provided with a nylon block 61 with detector surfaces.

The rollers 13 are also preferably made of nylon.

As already stated, all the pivots 35 and 39 of the regulator and control elements are accommodated in the bearing 36. A lubricating hole 62 extends to all said pivots. To ensure that all the regulator and control elements remain in the positions to which they are set, known dampers or pawl mechanisms unlockable against spring force may be used. The hole 62 of bearing 36 is also preferably filled with a drawing grease of very high viscosity and tackiness. The movements of the regulator and control elements are then damped by this grease while the end positions of the control elements are determined by the fact that in the control position the control elements strike against the bottom edge 63 of track 31 while in the inoperative position they strike against the parts of the wall 32.

The pins 12 of the holders are also preferably lubricated with drawing grease to prevent the movable parts 14 and 15 from losing their third relative position as a result of vibration. The movable parts 14 and 15 and/or the regulator and control elements can also be elegantly fixed in a specific position by means of magnets so that a very thinly fluid lubricant can be used.

It is very advantageous to make the block 45 from nylon. This results in a lightweight block, this being important more particularly in connection with inertia forces if a very large number of articles have to be unloaded per unloading point and per unit of time.

The counterweight of the bush 17 may be so heavy that the movable parts of a holder 1 automatically assume the third relative position. It is however preferable to compel the roller 21 of each empty holder 1 to assume the third position before the loading station. To this end, a guide 65 may be provided before the loading station to bring the roller 21 from the unloading position to the third position. As a result of this guide 65 the weight of the bush 17 which forms the counterweight can be reduced. In combination with the guide 65 it is advantageous to use a holder construction in which the adjustable parts 14 and 15 are so balanced that they remain in the third relative position by their own weight while on the other hand when they are in the closed relative position they tend to assume the open relative position. This effect is achieved by disposing the bush 17 at such an angle to the actuating lever 19 that when the roller is in the third position the lever 19 tends to turn the movable part 14 in the anti-clockwise direction, while when the roller 21 is in the closing position the lever 19 tends to turn the part 14 in the clockwise direction. The advantage of this is that the counterweight then co-operates with, instead of counteracting, the opening of the holder.

What I claim is:
1. Apparatus for successively unloading holders at a series of unloading points, comprising
   (a) a plurality of holders each including at least two parts connected to move relatively to one another so as to achieve a first and second condition in which the bottom of the holder is respectively closed for moving a load and open for delivering a load and a third condition in which the top of the holder is open and the bottom is closed for receiving a load,
   (b) gravity operable means on said movable parts to drive a holder from its third, empty condition to its first and closed condition by the weight of a load introduced into the holder,
   (c) means for moving said holders along a path toward and past an unloading station including said series of unloading points,
   (d) actuating means for closing and opening each holder carried by and coupled to one of said parts and movable with the holders along first, second and third tracks parallel to said path and corresponding to said three conditions of the holders,
   (e) and a regulator element including control means for each unloading point operative to move the regulator element to an obstructing position across the first track to engage and displace the actuating means of a bottom closed holder into said second track so as to open the bottom of the holder when the unloading point is empty and requires a load,
   (f) said control means being operative to move said regulator element away from said first track to an unobstructing position in which all three tracks are clear when the unloading point is filled.
   (g) and said third track being spaced from said regulator elements in both their obstructing and unobstructing positions so as to maintain a holder in empty, top open condition as it passes either an empty or filled unloading point.

2. Apparatus according to claim 1, wherein said movable parts of said holder are so connected as to assume and maintain their third condition under the influence of their own weight.

3. Apparatus according to claim 1, wherein biasing means are provided to move said parts of the holders to assume and maintain said third condition.

4. Apparatus according to claim 1, wherein said holders are provided with dampers for damping the relative movements of the two parts.

5. Apparatus according to claim 1, wherein at least one of the two holder parts is pivotable in a bearing lubricated with syrupy grease.

6. Apparatus according to claim 1, wherein one of said two movable parts, said regulator and said control means of at least one holder is temporarily fixed by magnet means.

7. Apparatus according to claim 1, wherein a guide is provided before a holder loading station to guide the actuating means into the third track.

8. Apparatus according to claim 1, wherein said control means comprises a control element coupled to said regulator element and displaceable by engagement with said actuating means from a position obstructing the second track so as to move the corresponding regulator element from its obstructing position across the first track and prevent subsequent unloading at a filled unloading point.

9. Apparatus according to claim 8, wherein said regulator and control elements are of one piece construction.

10. Apparatus for successively depositing articles at a series of unloading points, comprising in combination,
    conveyor mechanism having a flight passing over said series of unloading points,
    a plurality of holders carried by said conveyor mechanism,
    each holder having a bottom for supporting articles and defined at least in part by a member movable between three distinct positions, a first position in which the holder is empty, a second position in which the holder contains and holds an article, and a third position in which the member is positioned to allow an article to pass through said bottom and be discharged from the holder,
    actuator means movable with each member for sweeping first, second and third paths adjacent said conveyor mechanism corresponding to the first, second and third positions of said members, a series of elements corresponding to the different unloading points movable individually from an inoperative position out of said second path to an operative position within said second path for diverting said actuator means from said second to said third paths thereof and, in so doing, to move a corresponding member to its third position to discharge an article, means responsive to movement of an actuator means from its second to its third path for moving one of said elements at a time from its inoperative to its operative position and including return means for returning the so-moved element to its inoperative position in response to movement of subsequent actuator position in response to movement of a subsequent actuator means along said third path.

References Cited by the Examiner

UNITED STATES PATENTS 2,295,651   9/1942   Gustafson ........ 198—143 X

ANDRES H. NIELSEN, *Primary Examiner.*

EDWARD A. SROKA, *Examiner.*